United States Patent
Nagata et al.

[11] Patent Number: 6,118,505
[45] Date of Patent: Sep. 12, 2000

[54] LIQUID CRYSTAL DISPLAY DEVICE HAVING COLOR ORGANIC FILM AS THE INTERLAYER INSULATOR

[75] Inventors: Hisashi Nagata, Nara; Keiichi Tanaka, Tenri; Shingo Jogan, Kyoto, all of Japan

[73] Assignee: Sharp Kabushiki Kaisha, Osaka, Japan

[21] Appl. No.: 09/007,536

[22] Filed: Jan. 15, 1998

[30]     Foreign Application Priority Data

Jan. 21, 1997  [JP]  Japan ..................................... 9-009009

[51] Int. Cl.[7] ................................................ G02F 1/1335
[52] U.S. Cl. ............................................ 349/106; 349/39
[58] Field of Search ....................... 349/106, 39; 359/891

[56]                   References Cited

U.S. PATENT DOCUMENTS 5,859,683   1/1999   Tagusa et al. ............................. 349/39

FOREIGN PATENT DOCUMENTS 2-285678  11/1990   Japan .

4-253028   9/1992   Japan ..................................... 349/106

OTHER PUBLICATIONS

Bahadur Liquid Crystals Applications and Uses, vol. 1, pp. 178–181, 1990.

*Primary Examiner*—James A. Dudek
*Attorney, Agent, or Firm*—Nixon & Vanderhye P.C.

[57]                    ABSTRACT

A method for fabricating a liquid crystal display device is provided. The liquid crystal display device includes an active matrix substrate, a counter substrate disposed to face the active matrix substrate, and a liquid crystal layer interposed between the active matrix substrate and the counter substrate. The active matrix substrate includes: gate signal lines for supplying control signals and source signal lines for supplying video signals formed to cross each other; switching elements formed at crossings of the gate signal lines and the source signal lines in a matrix, the switching elements being connected to the gate signal lines and the source signal lines; an interlayer insulating film formed on the resultant active matrix substrate; and pixel electrodes formed on the interlayer insulating film in a matrix, wherein a color organic film is used as the interlayer insulating film, and laminated to the resultant active matrix substrate.

27 Claims, 13 Drawing Sheets

LIQUID CRYSTAL DISPLAY DEVICE HAVING COLOR ORGANIC FILM AS THE INTERLAYER INSULATOR

BACKGROUND OF THE INVENTION

1. Field of the Invention

The present invention relates to a liquid crystal display device for color display and a method for fabricating the same.

2. Description of the Related Art

FIG. 12 is a schematic view of a liquid crystal display device for color display. Referring to FIG. 12, source signal lines 101 and gate signal lines 102 run crossing each other, with pixels 103 formed at the respective crossings to be arranged in a matrix. Each of the pixels 103 includes a thin film transistor (TFT) 104 as well as a pixel capacitance 105 and a storage capacitance 106 connected to a drain of the TFT 104. The pixel capacitances 105 of the pixels 103 are connected to a counter electrode (not shown) of the liquid crystal display device via capacitance lines 107.

Sources of the TFTs 104 of each vertical column are commonly connected to one source signal line 101. Gates of the TFTs 104 of each horizontal row are commonly connected to one gate signal line 102.

The gate signal lines 102 are sequentially made active in synchronization with each scanning, thereby turning on the corresponding horizontal rows of TFTs 104. Every time one row of TFTs 104 are turned on, video signals allocated to the source signal lines 101 are allowed to be written in the pixel capacitances 105 of the TFTs 104 of the row. In this way, a set of video signals representing one image on a display screen are written in all the pixel capacitances 105 arranged in a matrix, thus accomplishing the display of the image.

FIG. 13 is an enlarged view of one pixel of the conventional liquid crystal display device, and FIG. 14 is a sectional view taken along line C–C' of FIG. 13.

Referring to FIG. 13, each pixel of the liquid crystal display device includes the TFT 104, a storage capacitance electrode 113, and a rectangular pixel electrode 114. The gate signal lines 102 run along the upper and lower peripheries of the pixel electrode 114, and the source signal lines 101 run along the right and left peripheries of the pixel electrode 114.

Referring to FIG. 14, the gate signal line 102 and the storage capacitance electrode 113 (not shown in FIG. 14) are formed on a substrate 116, and a gate insulating film 117 is formed over the resultant substrate. A semiconductor layer 118 and a channel protection layer 119 are then formed, followed by the formation of an n$^+$-Si layer 120 which is to be the source and drain of the TFT 104. An ITO film is then formed and patterned to form a drain signal line 112 and the source signal line 101. An interlayer insulating film 121 is formed over the resultant substrate, and a contact hole 122 is formed through the interlayer insulating film 121. Another ITO film is formed on the interlayer insulating film 121 and patterned, to form the pixel electrode 114 so that the pixel electrode 114 is connected with the drain signal line 112 via the contact hole 122. An alignment film 123 is formed on the pixel electrode 114 and rubbed. Thus, an active matrix substrate 131 is formed.

A photosensitive color resist film 126, a counter electrode 127, and an alignment film 128 are sequentially formed in this order on a substrate 125, so as to form a counter substrate 132.

The resultant active matrix substrate 131 and the resultant counter substrate 132 are placed to face each other, and liquid crystal is injected therebetween, to form a liquid crystal layer 124.

With the above configuration where the interlayer insulating film 121 is formed above the source signal line 101 and the gate signal line 102 to separate these lines from the pixel electrode 114, the pixel electrode 114 is allowed to overlap the signal lines 101 and 102. This enhances the aperture ratio of the pixel, and also blocks the electric field caused by the signal lines, thereby suppressing a failure in the orientation of liquid crystal molecules (see Japanese Laid-Open Publication No. 58-172685).

Alternatively, the photosensitive color resist film 126 of the counter substrate 132 may be omitted and, instead, a layer of a black mask and a color filter may be formed integrally in the active matrix substrate 131 to serve as the interlayer insulating film 121 (see Japanese Laid-Open Publication No. 6-242433). This alternative case eliminates the necessity of considering an alignment error at the attachment of the active matrix substrate 131 and the counter substrate 132 which is required in the former case where the black mask and the color filter are formed in the counter substrate 132. This also improves the aperture ratio.

In general, methods such as dying, electrodeposition, and pigment dispersion are employed to form a color filter for each pixel of the liquid crystal display device. In the dying method and the electrodeposition method, the resultant color filter is poor in color fading resistance, or easily prone to color fading. In the pigment dispersion method where a material is applied by spinning to form a film, the material tends to be wasted. This requires further improvement in consideration of the cost reduction of the color filter.

The above problems also apply to the case of forming the black mask/color filter in the active matrix substrate 131 as the interlayer insulating film 121. Moreover, this method has additional problems as follows. The potential written in the entire capacitance of each pixel (the sum of the pixel capacitance and the storage capacitance) needs to be held for a predetermined time period (substantially corresponding to a frame period). This requires the TFT 104 to be covered with the black matrix to suppress the photoconductance of the TFTs 104. However, the characteristics of the TFTs 104 provided by the interlayer insulating film 121 should not be lost by the black matrix formed as the interlayer insulating film 121. Accordingly, the interlayer insulating film 121 serving as the black mask is required to have strict performance in the insulation and non-polarization properties.

Thus, in the case of forming the black mask/color filter in the active matrix substrate 131 as the interlayer insulating film 121, the dying method and the electrodeposition method are further difficult to be employed. When the pigment dispersion method is employed, care must be taken for the selection of the pigment and against pollution of the active matrix substrate with the pigment.

Another problem is as follows. Since the periphery of each pixel electrode 114 overlaps the corresponding gate signal line 102, the potential at the pixel capacitance largely changes due to an influence of a capacitance generated between the pixel electrode 114 and the gate signal line 102 in the overlap portion. When the film is formed by spinning in the pigment dispersion method, the control of the thickness of the interlayer insulating film 121 is difficult. This becomes more difficult the larger the active matrix substrate 131 is (i.e., the display screen is larger), causing a variation in the thickness of the interlayer insulating film 121. If the thickness of the interlayer insulating film 121 is not sufficiently uniform, the change of the potential at the pixel capacitance due to an influence of the capacitance between the periphery of the pixel electrode 114 and the gate signal line 102 is not uniform for all pixels. As a result, a large DC component is applied to a certain portion of the liquid crystal layer, and this significantly lowers the display quality and reliability at the portion.

In yet another problem, since the periphery of each pixel electrode 114 overlaps the corresponding source signal line 101, the capacitance between the pixel electrode 114 and the source signal line 101 becomes large. This causes a video signal on the source signal line 101 to influence the potential at the pixel capacitance via the enlarged capacitance between the pixel electrode 114 and the source signal line 101, varying the potential at the pixel capacitance. In other words, crosstalk arises along the source signal line 101, and thus line noise appears on the display screen.

To summarize the above, in the case of forming the black mask/color filter as the interlayer insulating film 121, strict performance in the insulation and non-polarization properties is required for the interlayer insulating film 121. This makes it extremely difficult to employ the dying method and the electrodeposition method. The pigment dispersion method, on the other hand, has a problem that the control of the thickness of the interlayer insulating film 121 is difficult. This difficulty in the thickness control causes various restrictions.

From the foregoing, the purpose of the present invention is to provide a liquid crystal display device capable of forming a black mask/color filter as the interlayer insulating film without lowering the display quality, and a method for fabricating such a liquid crystal display device.

SUMMARY OF THE INVENTION

The present invention provides a method for fabricating a liquid crystal display device. The liquid crystal display device includes an active matrix substrate, a counter substrate disposed to face the active matrix substrate, and a liquid crystal layer interposed between the active matrix substrate and the counter substrate. The active matrix substrate includes: gate signal lines for supplying control signals and source signal lines for supplying video signals formed to cross each other; switching elements formed at crossings of the gate signal lines and the source signal lines in a matrix, the switching elements being connected to the gate signal lines and the source signal lines; an interlayer insulating film formed on the resultant active matrix substrate; and pixel electrodes formed on the interlayer insulating film in a matrix, wherein a color organic film is used as the interlayer insulating film, and laminated to the resultant active matrix substrate.

With the above configuration, since a color organic film is laminated to form the interlayer insulating film, the thickness of the interlayer insulating film is uniform. The conventional problems caused by the variation in the thickness of the interlayer insulating film are therefore overcome.

With the above configuration, even when the size of the active matrix substrate is made large, the uniform thickness of the interlayer insulating film can be maintained because it is only required to change the size of the color organic film in compliance with the size of the active matrix substrate.

In the conventional pigment dispersion method, however, as the size of the active matrix substrate is larger, the thickness of the interlayer insulating film tends to vary more easily and thus the control of the thickness of the interlayer insulating film becomes more difficult. When the film is formed by spinning in the pigment dispersion method, a predetermined amount of water needs to be added to a-material to ensure satisfactory consistency of the material at the time of film formation. Accordingly, when the interlayer insulating film is dried by baking after the film formation, the thickness of the film changes due to this water content.

By using the color organic film as the interlayer insulating film, uniform thickness can be easily obtained. Also, by using a dry film where the polymerization has proceeded to a minute level, the thickness hardly varies by the baking since the binder content is small.

In one embodiment of the invention, the color organic film is photosensitive, and after being laminated, the color organic film is patterned by light exposure and development. This simplifies the production process, and good mass-productivity and cost reduction are achieved.

In another embodiment of the invention, after the color organic film is laminated, a photoresist is formed, exposed to light, and developed, to pattern the color organic film by etching. This increases the number of steps, but allows the color organic film to be processed with high precision.

When the film is formed by spinning in the conventional pigment dispersion method, a resin material is applied over a wide range of the resultant active matrix substrate though only a small percentage of the applied resin material is finally left on the active matrix substrate as the interlayer insulating film. This raises the production cost. According to the present invention, however, the amount of wasted material is small and thus the production cost is low.

In still another embodiment of the invention, the color organic film is composed of primary color film pieces arranged in a matrix, for example. The primary color film pieces are obtained by laminating transparent organic films colored with the respective primary colors and then patterning the transparent organic films.

The primary color film pieces constituting the color organic film serve as color filters, and are formed by pattering the laminated transparent organic films.

In still another embodiment of the invention, the adjacent primary color film pieces are overlapped with each other at the boundary thereof.

Since the primary color film pieces with different colors are overlapped, the overlap portion has the light-shading property, preventing light from leaking from each boundary of adjacent pixels.

In a direct-view transparent liquid crystal display device, the primary color film pieces are colored with red, green, and blue colors. These primary color film pieces are formed on the respective pixels, while light-shading film pieces are formed on the portions which are not used as the pixels. In a reflective liquid crystal display device or in the case where a complementary color needs to be used, the primary color film pieces are colored with cyan, magenta, and yellow colors. The cyan, magenta, and yellow colors are also employed for a projection display device using three liquid crystal light bulbs. In this case, the color organic film is made of a one-color transparent organic film, or it is made of a one-color transparent organic film and a light-shading film, for each of the three liquid crystal light bulbs.

In still another embodiment of the invention, the color organic film further includes light-shading film pieces, and the light-shading film pieces are obtained by laminating a light-shading organic film and then patterning the light-shading organic film.

The light-shading film pieces serve as a black matrix. For example,. the primary color film pieces have boundaries along the edges of the pixels (e.g., above the source signal lines). If the patterning of the color organic film at the boundaries is not sufficiently precise, or the control of the taper angle at the edges of the primary color film pieces is difficult, the required thickness of the interlayer insulating film is not secured along the boundaries. This may cause light leakage. In such a case, the light-shading film pieces are formed at the boundaries of the primary film pieces.

In still another embodiment of the invention, in order to form the light-shading film pieces, the laminated light-shading organic film is subjected to pattern exposure from the top surface of the active matrix substrate and overall exposure from the bottom surface of the active matrix substrate. By the overall exposure from the bottom surface of the active matrix substrate, the light-shading film pieces can be formed for all of the portions where light leakage may arise.

In still another embodiment of the invention, the light-shading film pieces are disposed above the source signal lines.

In still another embodiment of the invention, the source signal lines are made of a transparent conductive film (e.g., an ITO film), and the light-shading film pieces are disposed above the source signal lines by laminating the light-shading organic film to the resultant active matrix substrate and allowing the light-shading organic film to be subjected to the overall exposure from the bottom surface of the active matrix substrate.

In still another embodiment of the invention, the interlayer insulating film is composed of a color organic film and a photosensitive overcoat film. The overcoat film is laminated to the color organic film, and then patterned by light exposure and development. This simplifies the production process, and good mass-productivity and cost reduction are obtained.

In still another embodiment of the invention, the interlayer insulating film is composed of a color organic film and a photosensitive overcoat film, and after the overcoat film is laminated to the color organic film, a photoresist is formed, exposed to light, and developed, to pattern the overcoat film by etching. This increases the number of steps, but the organic films can be processed with high precision.

The overcoat film, which constitutes the upper portion of the interlayer insulating film, covers the unevenness of the color organic film, making the top surface of the interlayer insulating film smooth. As a result, the pixel electrodes formed on the overcoat film are not easily disconnected, reducing the occurrence of failures.

The interlayer insulating film according to the present invention not only serves as the color filter and the black matrix, but also satisfactorily serves as the insulating film. That is, the interlayer insulating film sufficiently reduces the capacitances between the pixel electrodes and the source signal lines or the gate signal lines.

In one embodiment, after the formation of the color organic film and the overcoat film, a photoresist is formed, exposed to light, and developed, to etch the color organic film and the overcoat film, so as to form contact holes.

Alternatively, after the formation of the color organic film and the overcoat film, baking is performed, and then a photoresist is formed, exposed to light, and developed, to etch the color organic film and the overcoat film, so as to form contact holes.

By baking the overcoat film before the etching, the difference in the etching rate between the color organic film and the overcoat film can be reduced even when the color organic film has been previously baked.

According to another aspect of the invention, a liquid crystal display device is provided. The device includes an active matrix substrate, a counter substrate disposed to face the active matrix substrate, and a liquid crystal layer interposed between the active matrix substrate and the counter substrate, the active matrix substrate including: gate signal lines for supplying control signals and source signal lines for supplying video signals formed so as to cross each other; switching elements formed at crossings of the gate signal lines and the source signal lines in a matrix, the switching elements being connected to the gate signal lines and the source signal lines; an interlayer insulating film formed on the resultant active matrix substrate; and pixel electrodes formed on the interlayer insulating film in a matrix, wherein a color organic film is used as the interlayer insulating film.

In one embodiment of the invention, the interlayer insulating film further includes an overcoat film formed on the color organic film.

In another embodiment of the invention, contact holes are formed through the interlayer insulating film, and the pixel electrodes are connected to the witching elements via the contact holes.

In still another embodiment of the invention, the liquid crystal display device further includes storage capacitance electrodes, wherein a storage capacitance obtained by each of the storage capacitance electrodes is connected in parallel with a pixel capacitance obtained by the pixel electrode, and each contact hole overlaps the storage capacitance electrode.

In still another embodiment of the invention, each contact hole completely overlaps the storage capacitance electrode.

Since the portion of the interlayer insulating film where the contact hole is formed does not serve as the color filter nor the black matrix, light passing through the contact hole degrades the display on the display screen. Such light is blocked by the storage capacitance electrode. The surface of the active matrix substrate in contact with the liquid crystal layer has recesses corresponding to the contact holes. These recesses disturb the orientation of liquid crystal molecules and generate reverse-tilt domains. Since the contact holes are located above the storage capacitance electrodes, such reverse-tilt domains can be concealed by the storage capacitance electrodes. The reverse-tilt domains are therefore invisible on the display screen, and thus the contrast of the display screen is prevented from lowering.

In still another embodiment of the invention, the taper angle of the contact hole is 45° or less. As a result, the surface of the interlayer insulating film is smooth, and the pixel electrodes is not easily disconnected.

In still another embodiment of the invention, contact holes are formed through the interlayer insulating film, and the pixel electrodes are connected to the switching elements via the contact holes. Also, the inner wall of each of the contact holes is covered with the overcoat film. By covering the inner wall of the contact hole with the overcoat film, the inner wall of the contact hole can be made smooth.

In still another embodiment of the invention, contact holes are formed through the interlayer insulating film, and the pixel electrodes are connected to the switching elements via the contact holes. Also, the inner wall of each of the contact holes includes an exposed face of the color organic film and an exposed face of the overcoat film.

In the above case, in order to avoid a step to be formed between the faces of the films, the overcoat film should be baked before the etching to reduce the difference in the etching rate between the color organic film and the overcoat film.

In still another embodiment of the invention, each of the pixel electrodes overlaps the corresponding source signal line by an overlap width of 1 μm or more, and when the video signals with one polarity on the source signal lines are supplied to one row of switching elements lined along one gate signal line, the video signals on the source signal lines are supplied to the next row of switching elements lined along the next gate line by inverting the polarity, and this is repeated for the remaining gate signal lines.

In the above case, even if a video signal on one source signal line affects the potentials at the pixel capacitances via the capacitances between the pixel electrodes and the source signal lines, the variation in the potential at the pixel capacitances can be reduced since the polarity of the video signal is frequently changed. In other words, crosstalk generated along this source signal line is suppressed.

In still another embodiment of the invention, the ratio of the capacitance between the pixel electrode and the source signal line to the sum of the pixel capacitance obtained by the pixel electrode and the storage capacitance obtained by the storage capacitance electrode is 10% or less. This reduces the influence of the crosstalk, and good display quality is obtained.

In still another embodiment of the invention, the thickness of the interlayer insulating film is 2 μm or more regardless of whether the interlayer insulating film is composed of only the color organic film or of the color organic film and the overcoat film. With this setting, the ratio of the capacitance between the pixel electrode and the source signal line to the sum of the pixel capacitance and the storage capacitance can be 10% or less.

Thus, the invention described herein makes possible the advantages of (1) providing a liquid crystal display device capable of forming a black mask/color filter as the interlayer insulating film without lowering the display quality, and (2) providing a method for fabricating such a liquid crystal display device.

These and other advantages of the present invention will become apparent to those skilled in the art upon reading and understanding the following detailed description with reference to the accompanying figures.

DESCRIPTION OF THE PREFERRED EMBODIMENTS

Hereinbelow, the present invention is described by way of examples with reference to the accompanying drawings.

EXAMPLE 1

Figure 1:
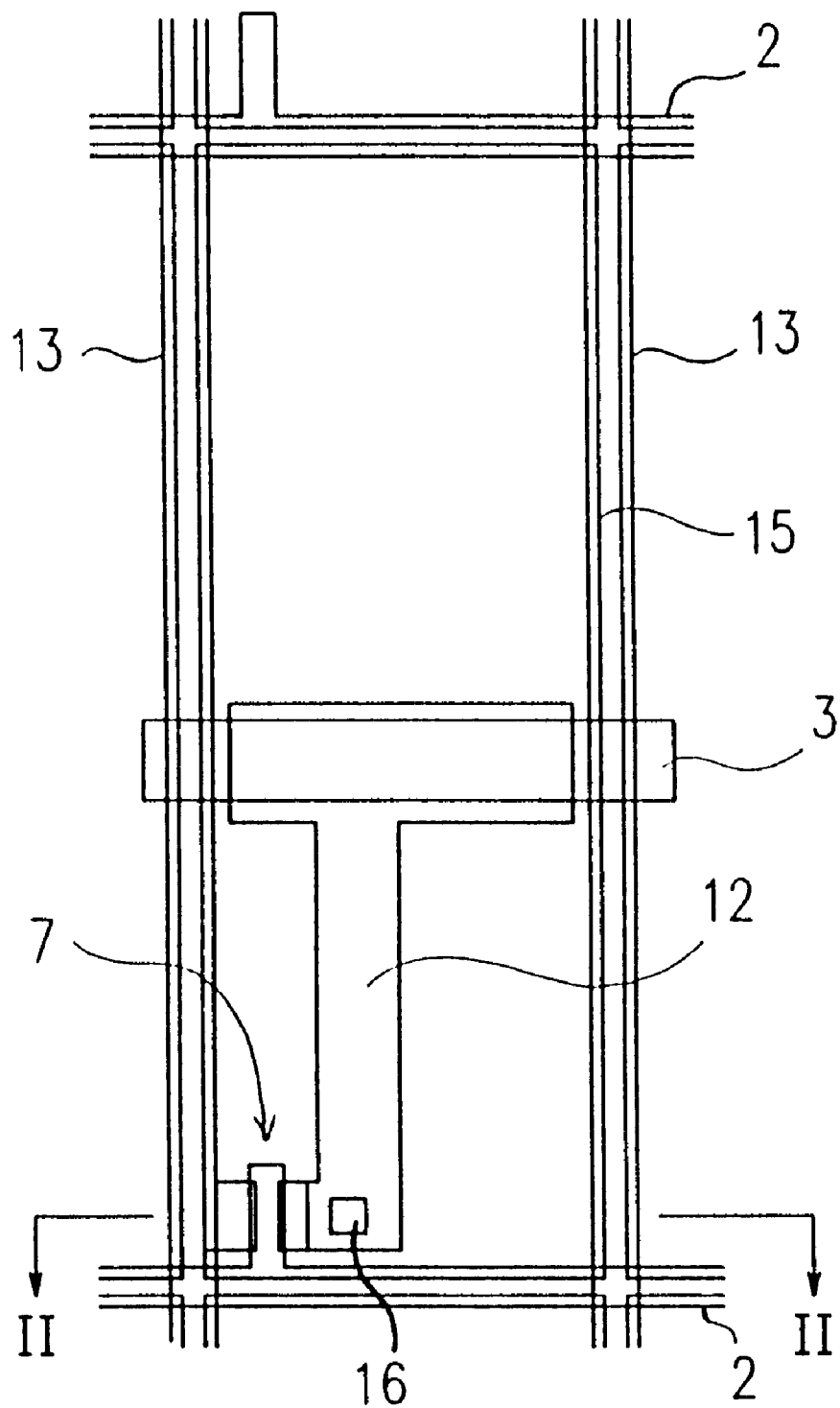
FIG. 1 is a plan view of one pixel of a liquid crystal display device of Example 1 according to the present invention.
Figure 2:
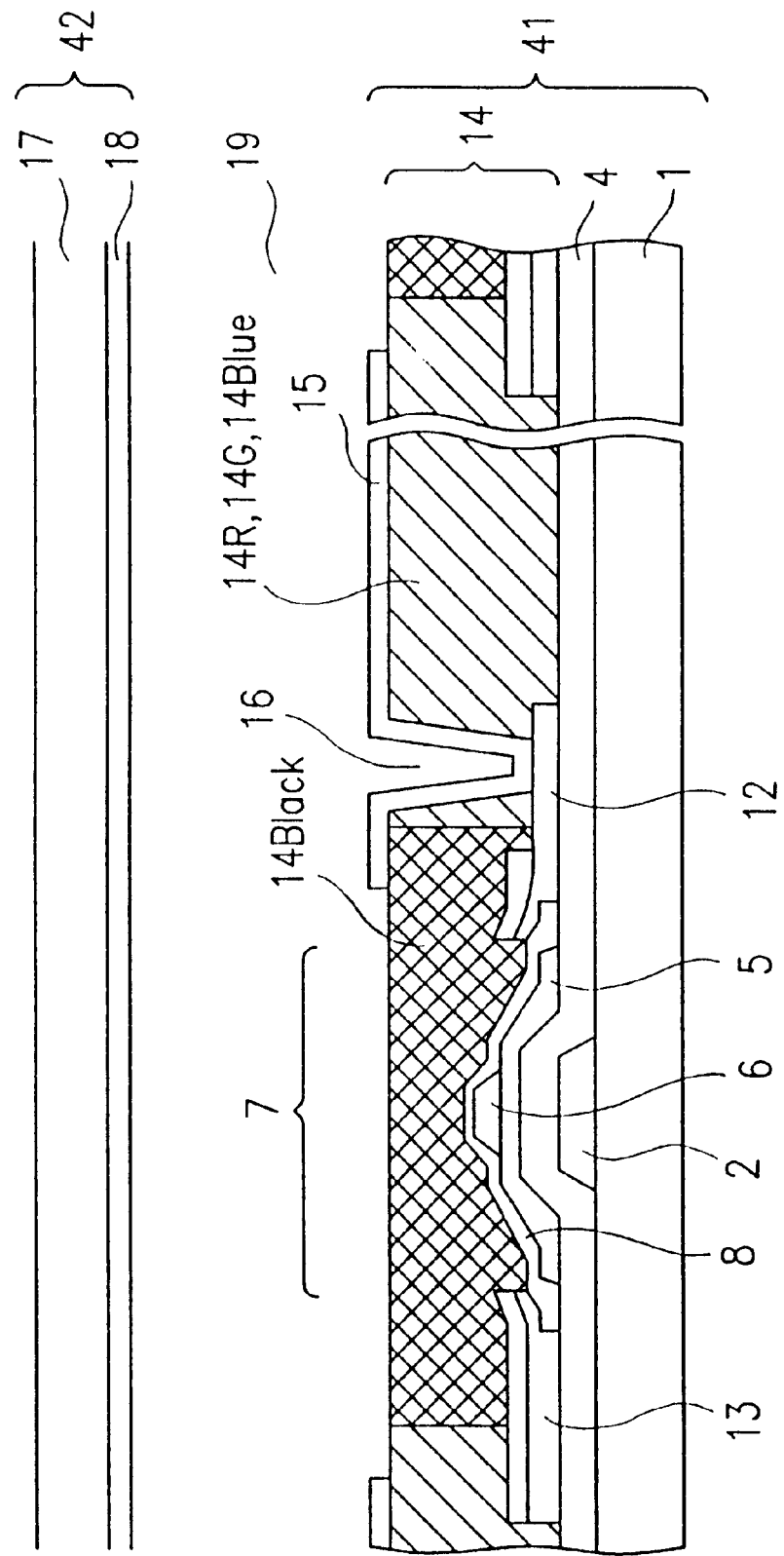
FIG. 2 is a sectional view taken along line A–A' of FIG. 1.

FIG. 1 is a plan view of one pixel of a liquid crystal display device of Example 1 according to the present invention. FIG. 2 is a sectional view taken along line A–A' of FIG. 1.

The configuration of the liquid crystal display device will be described together with the fabrication method thereof.

Figure 13:
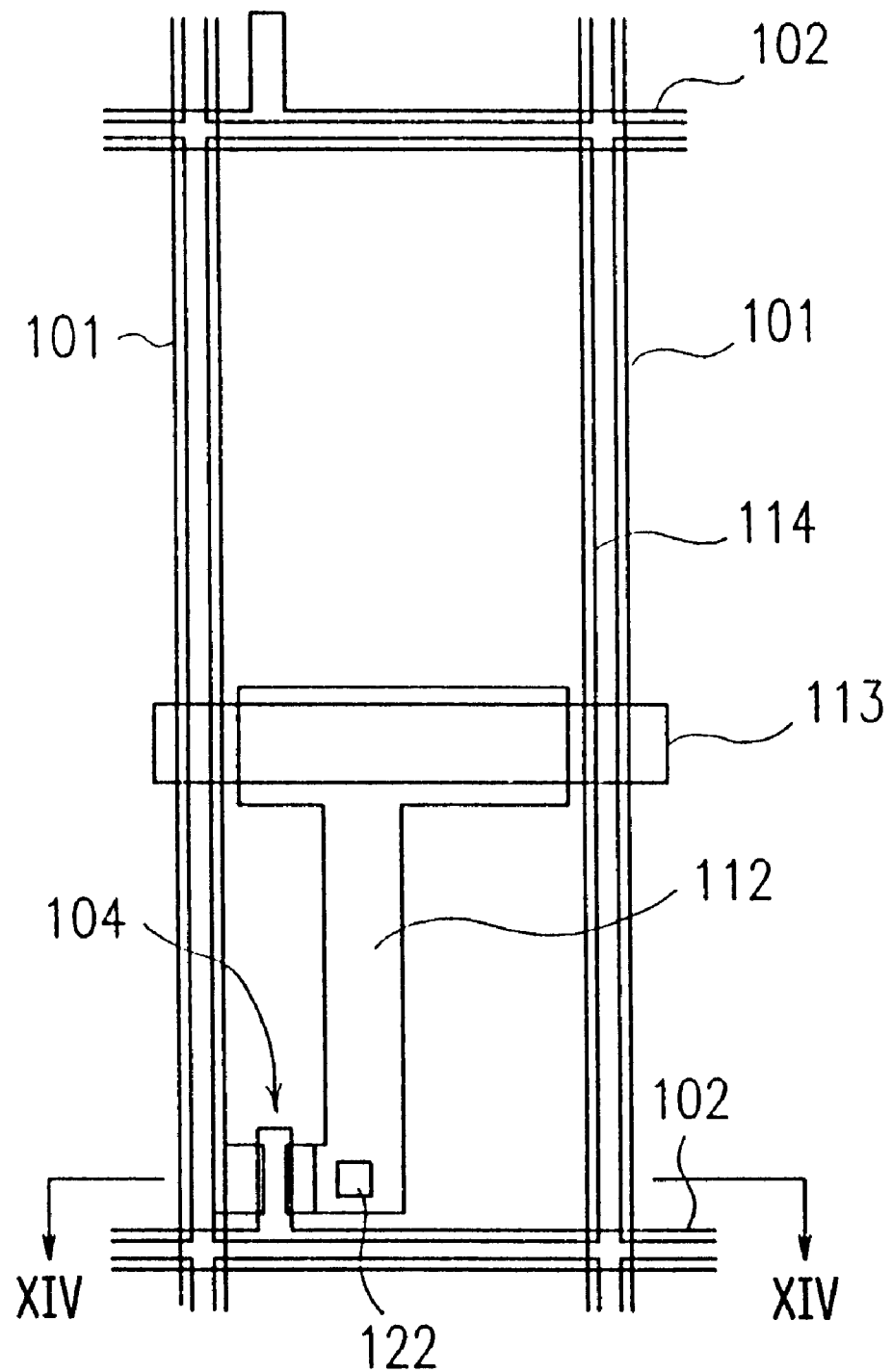
FIG. 13 is a plan view of one pixel of a conventional liquid crystal display device.
Figure 14:
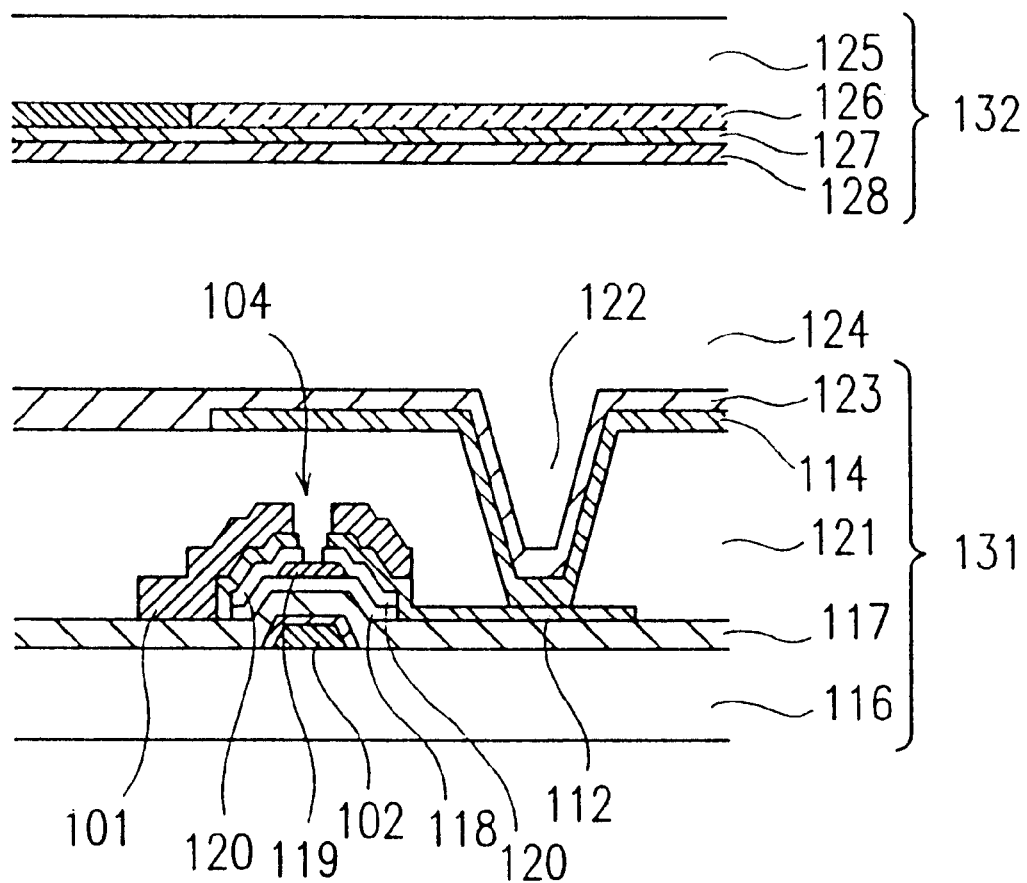
FIG. 14 is a sectional view taken along line C–C' of FIG. 13.

Gate signal lines 2 and storage capacitance electrodes 3 are formed on a substrate 1, and a gate insulating film 4 is formed over the resultant substrate. A semiconductor layer 5 and a channel protection layer 6 for each TFT 7 are then formed, followed by the formation of an $n^+$-Si layer 8 which is to be the source and drain of the TFT 7. The above steps of the fabrication process is the same as the conventional ones described above with reference to FIGS. 13 and 14.

Subsequently, a metal layer and an ITO layer are formed on the resultant layer by sputtering and patterned to form drain signal lines 12 and source signal lines 13, each composed of the metal layer and the ITO layer. With this double-layer structure, if a defect arises in either one of the metal layer and the ITO layer of the source signal lines 13, the defect can be compensated by the other layer. This reduces the possibility of the disconnection of the source signal lines 13.

Figure 3:
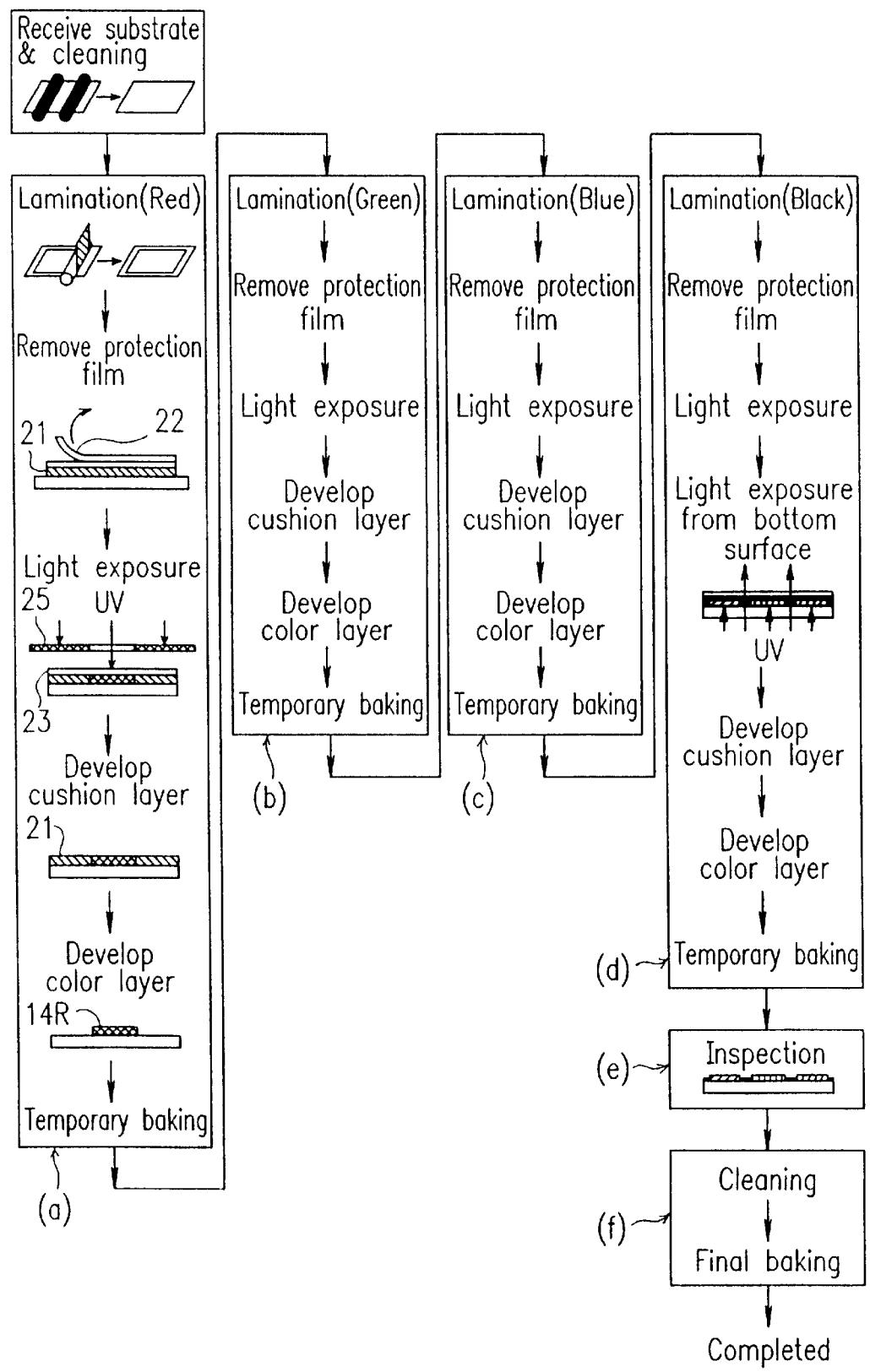
FIG. 3 is a flowchart showing the procedure for producing a color organic film by a DFL method for the liquid crystal display device of FIG. 1, where process (a) represents the production of red film pieces, process (b) represents the production of green film pieces, process (c) represents the production of blue film pieces, process (d) represents the production of light-shading film pieces, process (e) represents the inspection of the resultant film, and process (f) represents the cleaning and baking of the film.

Then, an interlayer insulating film, i.e., a color organic film 14 will be formed in accordance with the production procedure of a DFL method shown in FIG. 3. The color organic film 14 is composed of red film pieces 14R, green film pieces 14G, blue film pieces 14Blue, and light-shading film pieces 14Black.

Referring to FIG. 3, at process (a), a 3 μm-thick transparent organic film 21 which is a photosensitive (negative-type) dry film with a red pigment dispersed therein is laminated to the resultant substrate. After removing a protection film 22 from the transparent organic film 21, portions of the transparent organic film 21 corresponding to pixels which are to display the red color except for portions corresponding to a contact hole 16 and the TFT 7 of each pixel are exposed to light via a mask 25, to develop a cushion layer 23. The red transparent organic film 21 is then developed with an alkaline solution to form the red film pieces 14R which cover the red pixels, and baked at 250° C.

In this example, the thickness of the color organic film 14 is set at 3 μm (at least 2 μm is required as described below). Also, each contact hole 16 is formed to taper at 45° so that the inner wall of the contact hole 16 has a gentle taper shape. This tapering is performed so that an ITO layer for pixel electrodes 15 to be formed in a subsequent step is protected from being broken at the step of the contact hole 16.

The above baking is performed to thermally polymerize a reaction base of the organic film which has not been sufficiently polymerized at the patterning by photolithography, so as to prevent impurities from eluting from the color organic film 14 to a liquid crystal layer and the semiconductor layer during the image display of the resultant liquid crystal display device. This otherwise may cause a breakdown or lowering of the display quality. The baking also enhances the adhesion of the color organic film 14 with the underling material. The baking at 250° C. hardly fades the color of the pigment nor affects a-Si material.

Subsequently, at process (b), a 3 μm-thick photosensitive green transparent organic film is laminated to the resultant substrate. After removing a protection film from the transparent organic film, portions of the transparent organic film corresponding to pixels which are to display the green color except for portions corresponding to the contact hole 16 and the TFT 7 of each pixel are exposed to light via a mask, to develop a cushion layer. The green transparent organic film is then developed with an alkaline solution to form the green film pieces 14G which cover the green pixels, and baked.

Likewise, at process (c), a 3 μm-thick photosensitive blue transparent organic film is laminated to the resultant substrate. After removing a protection film from the transparent organic film, the transparent organic film is exposed to light and developed as described above, to form the blue film pieces 14Blue which cover the green pixels, and baked.

Then, at process (d), a 3 μm-thick photosensitive light-shading organic film with a black pigment dispersed therein is laminated to the resultant substrate. After removing a protection film from the light-shading organic film, portions of the light-shading organic film corresponding to portions of the substrate where none of the above film pieces is formed and a metal film does not underlie, as well as portions corresponding to the TFTs 7, are exposed to light, to develop a cushion layer. The light-shading organic film is then developed with an alkaline solution to form the black light-shading film pieces 14Black.

In process (d) above, the light-shading film piece 14Black is formed on each TFTs 7 due to the following reason. If incident light from above reaches the TFT 7, an OFF current through the TFT 7 increases due to light excitation. This lowers the holding of charges by the pixel electrode. To prevent this problem, the TFT 7 is light-shaded.

The light exposure to the portion of the light-shading organic film corresponding to each TFT 7 in process (d) is performed from the top surface of the substrate 1 via a mask. The light exposure to the portions of the light-shading film where none of the color film pieces is formed and a metal film does not underlie is performed from the bottom surface of the substrate 1 via a mask. The light-shading film pieces 14Black are formed on these portions to prevent light from leaking from these portions to the display screen. By exposing light to these portions from the bottom surface of the substrate 1, the light-shading film pieces 14Black can be patterned with high precision, compared with the light exposure from the top surface of the substrate 1. This ensures the prevention of the light leakage without wastefully forming the light-shading film pieces 14Black on unnecessary portions. Moreover, if a defect is formed in a preceding color film piece, such a defect can be covered with the light-shading film piece 14Black in this process. The defect therefore becomes less visible. It should be noted, however, that the light-shading film piece 14Black should not be formed on the portion corresponding to each contact hole 16 which has been formed through the color film piece.

Alternatively, the light-shading film pieces 14Black may be formed on portions where none of the color film pieces is formed and a metal film underlies. In this case, the recess of the portion where none of the color film pieces is formed is filled with the light-shading film piece 14Black, flattening the surface of the resultant color organic film 14. Thus, the surface of the substrate 1 facing a liquid crystal layer 19 is made smooth. This suppresses the generation of a reverse-tilt domain due to disturbance of the orientation of the liquid crystal molecules.

When each source signal line 13 which is a metal film is covered with the light-shading film piece 14Black, light reflection from the source signal line 13 which may have a high reflectance is blocked by the light-shading film piece 14Black. As a result, the reflectance of the display screen is minimized, and thus the display quality improves.

When the light-shading film piece 14Black is formed on the source signal line 13, only a range narrower than the source signal line 13 may be exposed to light. The remaining portion of the source signal line 13 which has not been exposed to light may be subjected to the subsequent light exposure from the bottom surface of the substrate 1. With this process, the light-shading film piece 14Black covering each source signal line 13 can be formed with high precision.

In any case, the size of the light-shading film piece 14Black covering the source signal line 13 does not much affect the aperture ratio of the pixel. Accordingly, the control of the pattern exposure from the top surface of the substrate 1 for the formation of the light-shading film pieces 14Black is easy.

In the case where the source electrode 13 is made of a transparent conductive film such as an ITO film, the light-shading film piece 14Black covering the source electrode 13 can be formed only by the light exposure from the bottom surface of the substrate 1.

Each gap between the adjacent color film pieces may be light-shaded by overlapping the peripheries of the color film pieces, instead of forming the light-shading film piece 14Black. The overlap portion has sufficient light-shading property, because the transmittance of the overlap portion of two color film pieces is extremely low if the two film pieces have different peaks in a spectrum of transmitting light and also has satisfactory color purities. Moreover, the overlap portion of the two color film pieces is formed above the source signal line 13. This means that the interlayer insulating film is thick in this portion, and thus the source signal line 13 is sufficiently separated from the pixel electrode 15. This suppresses the crosstalk between the source signal line 13 and the pixel electrode 15, as will be described below, without reducing the transmittance of the pixel portion.

After the color organic film 14 is formed in the manner described above, the color organic film 14 is inspected in process (e), and cleaned and baked in process (f).

Thereafter, an ITO film is formed by sputtering and patterned to form the pixel electrodes 15 so that each pixel electrode 15 is connected with the drain signal line 12 via the contact hole 16.

The periphery of each pixel electrode 15 overlaps the corresponding source signal line 13 by a width of 1 $\mu$m. By this overlapping, the area of the pixel electrode 15 increases, thus increasing the aperture ratio of the pixel. The pixel electrode 15 blocks the electric field caused by the source signal line 13 and thus suppresses a failure in the orientation of liquid crystal molecules.

Thereafter, an alignment film (not shown) is formed over the pixel electrode 15, and rubbed. Thus, an active matrix substrate 41 is formed.

A counter electrode 18 and an alignment film (not shown) are formed in this order on a substrate 17, so as to form a counter substrate 42.

The resultant active matrix substrate 41 and the resultant counter substrate 42 are placed to face each other, and liquid crystal is injected in a space therebetween, to form the liquid crystal layer 19.

In Example 1 described above, each of the transparent organic films and the light-shading organic film is laminated to the substrate and then patterned, to form the color organic film 14 made of the film pieces. In this lamination method, the thickness of the color organic film 14 can be easily controlled regardless of the size of the display screen, and thus the conventional problems due to the variation in the thickness of the interlayer insulating film can be overcome.

Since the organic films are photosensitive, the fabrication process is simple, and good mass-productivity and cost reduction can be realized.

Since the thickness of the organic films is 3 $\mu$m, the properties of the color organic film 14 as the interlayer insulating film, i.e., the insulation and the non-polarization, are not lost.

An alternative method for fabricating the liquid crystal display device shown in FIGS. 1 and 2 will be described. The alternative method is the same as the method described above except for the production procedure for the color organic film 14. Therefore, only the production procedure for the color organic film 14 will be described in this alternative method.

The color organic film 14 is composed of red film pieces 14R, green film pieces 14G, blue film pieces 14Blue, and light-shading film pieces 14Black.

First, a 3 $\mu$m-thick transparent organic film with a red pigment dispersed therein is laminated to the resultant substrate. The transparent organic film in this alternative example is not photosensitive. A photoresist is therefore formed on the transparent organic film, and portions of the transparent organic film corresponding to pixels which are to display the red color except for portions corresponding to the contact hole 16 and the TFT 7 of each pixel are exposed to light, to develop the photoresist. The transparent organic film is then patterned by etching, to form the red film pieces 14R which cover the red pixels. The red film pieces 14R are then baked for fixing.

Subsequently, a 3 $\mu$m-thick green transparent organic film is laminated to the resultant substrate. A photoresist is formed on the transparent organic film, and portions of the transparent organic film corresponding to pixels which are to display the green color except for portions corresponding to the contact hole 16 and the TFT 7 of each pixel are exposed to light, to develop the photoresist. The transparent organic film is then patterned by etching, to form the green film pieces 14G which cover the green pixels. The green film pieces 14G are then baked for fixing.

Likewise, a 3 $\mu$m-thick blue transparent organic film is laminated to the resultant substrate. The formation, light exposure, and development of a photoresist are performed as described above. The transparent organic film is then patterned by etching, to form the blue film pieces 14Blue which cover the blue pixels.

Then, a 3 $\mu$m-thick light-shading organic film with a black pigment dispersed therein is laminated to the resultant substrate. After a photoresist is formed on the light-shading organic film, portions of the light-shading organic film corresponding to portions where none of the above film pieces is formed and a metal film does not underlie, as well as portions corresponding to the TFTs 7, are exposed to light, to develop the photoresist. The light-shading organic film is then patterned by etching, to form the black light-shading film pieces 14Black.

This alternative fabrication method using non-photosensitive organic films requires the additional steps of the formation, light-exposure, and development of a photoresist every time the organic films are patterned. This increases the number of steps required, but the patterning of the organic film is highly precise. Accordingly, each pixel can be formed with high precision while keeping a high aperture ratio. In contrast, in the fabrication method using the photosensitive organic films described above, since the organic films with a pigment dispersed therein are directly exposed to light, high resolution is not obtained. Therefore, the patterning of the organic films is less precise.

EXAMPLE 2

Figure 4:
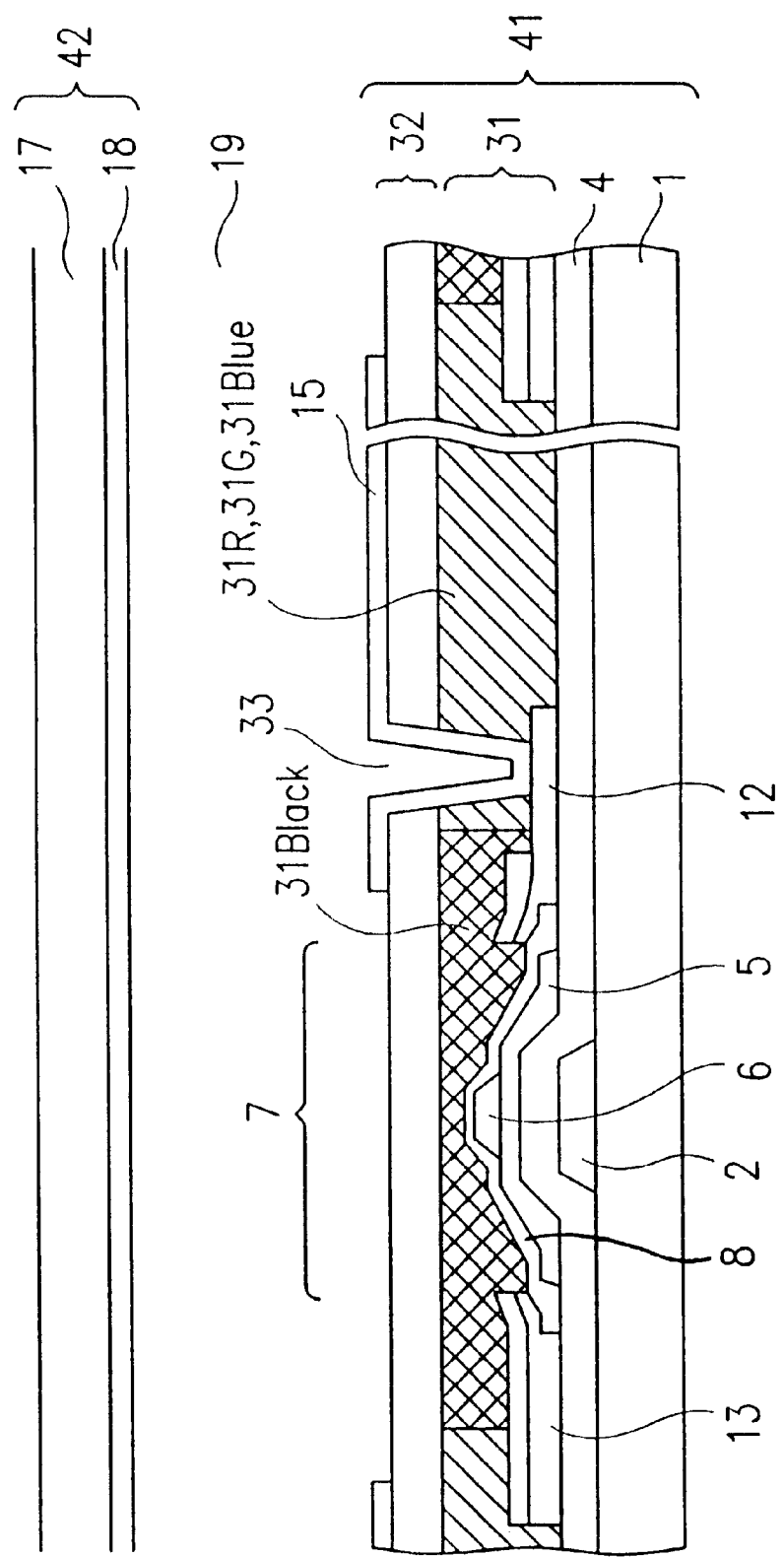
FIG. 4 is a sectional view of one pixel of a liquid crystal display device of Example 2 according to the present invention.

FIG. 4 is a sectional view of one pixel of a liquid crystal display device of Example 2 according to the present invention.

The liquid crystal display device of this example uses the combination of a color organic film 31 and an overcoat film 32 as the interlayer insulating film, instead of the color organic film 14 of the liquid crystal display device of Example 1 shown in FIGS. 1 and 2. The method for fabricating the liquid crystal display device of this example is the same as that described in Example 1, except for the production procedure for the color organic film 31 and the overcoat film 32. Therefore, only the production procedure for the color organic film 31 and the overcoat film 32 will be described below.

The color organic film 31 is composed of red film pieces 31R, green film pieces 31G, blue film pieces 31Blue, and light-shading film pieces 31Black.

First, a 1.5 $\mu$m-thick photosensitive transparent organic film with a red pigment dispersed therein is laminated to the resultant substrate. Portions of the transparent organic film corresponding to pixels which are to display the red color except for portions corresponding to a contact hole 33 and a TFT 7 of each pixel are exposed to light. The red transparent organic film is then developed with an alkaline solution to form the red film pieces 31R which cover the red pixels, and baked.

Likewise, a 1.5 μm-thick photosensitive green transparent organic film is laminated to the resultant substrate. After light exposure and development, the green film pieces 31G which cover the green pixels are formed, and baked. Then, a 1.5 μm-thick photosensitive blue transparent organic film is laminated to the resultant substrate. After light exposure and development, the blue film pieces 31Blue which cover the blue pixels are formed, and baked.

Then, a 1.5 μm-thick photosensitive light-shading organic film with a black pigment dispersed therein is laminated to the resultant substrate. Portions of the light-shading organic film corresponding to portions where none of the above film pieces is formed and a metal film does not underlie, as well as portions corresponding to the TFTs 7, are exposed to light, and the light-shading organic film is then developed with an alkaline solution to form the black light-shading film pieces 31Black, and baked.

After the color organic film 31 is formed as described above, the 1.5 μm photosensitive transparent overcoat film 32 is laminated to the resultant substrate. The overcoat film 32 except for portions thereof corresponding to the contact holes 33 is exposed to light. The resultant overcoat film 32 is developed with an alkaline solution to pattern the overcoat film 32, and baked.

Alternatively, a non-photosensitive organic material may be used as the organic films and the overcoat film 32. This alternative method requires additional steps of the formation, light exposure, and development of a photoresist every time the organic films and the overcoat film 32 are patterned. This increases the number of steps required, but the patterning of the organic films and the overcoat film 32 is highly precise.

Instead of forming the contact holes 33 every time the organic films and the overcoat film 32 are patterned as described above, the contact holes 33 may be formed after all the film pieces 31R, 31G, 31Blue, and 31Black and the overcoat film 32 have been formed, so as to extend through these film pieces and the overcoat film 32 at one time. In this case, the contact holes 33 can be formed with high precision if at least the overcoat film 32 is made of a non-photosensitive material and patterned using a photoresist, At this time, if an etchant for the organic films and the overcoat film 32 which can provide the same etching rate for both types of films is used, the faces of the organic films and the face of the overcoat film 32 continue smoothly at the inner wall of each contact hole 33 without generating a step. In the case where the overcoat film 32 is formed on the baked film pieces, in order to provide the same etching rate for the overcoat film 32, the overcoat film 32 is baked after the formation thereof, and then a photoresist is formed, exposed to light, and developed, to form the contact holes 33 by etching.

In this example, the thickness of the color organic film 31 is as small as 1.5 μm and the thickness of the overcoat film 32 is 1.5 μm, forming the double-layer interlayer insulating film with a total thickness of 3.0 μm. With this structure, the following advantages are obtained.

For example, in the formation of the 3.0 μm-thick color organic film 14 as described in Example 1, when the transparent organic films and the light-shading organic film are sequentially laminated and patterned, the formation of the second to last organic films is extremely difficult. Each film piece must be positioned so as to be as close as several micromicrons to a step formed by the previously-formed film piece without forming bubbles. If bubbles are formed, the possibility of generating problems such as peeling-off of the color organic film 14, signal leakage between the pixel electrode 15 and the source signal line 13 due to the peeling-off, and light leakage increases.

In the case of forming the 1.5 μm-thick color organic film 31 as in this example, the steps of the previously-formed film pieces are low. The positioning of the film pieces of the second to last organic films to be close to the steps is easier if the steps are low.

Another advantage is as follows. It is difficult to make the surfaces of the film pieces 31R, 31G, 31Blue, and 31Black flat at the boundaries of the adjacent pieces in consideration of the precision of the patterning of the transparent organic films. The surfaces can be flattened by forming the overcoat film 32 over these film pieces. This prevents the pixel electrodes 15 formed on the overcoat film 32 from being easily disconnected, and thus reduces the occurrence of failures. Moreover, since the surface of the active matrix substrate in contact with the liquid crystal layer is also flattened, the orientation of the liquid crystal molecules is prevented from being disturbed. This reduces the generation of the reverse-tilt domain, and thus prevents failure in the display due to the reverse-tilt domain.

As described in Example 1, the inner wall of each contact hole 33 is in a gentle taper shape so that the pixel electrode 15 is not disconnected. In this example, the contact hole 33 which extends through the color organic film 31 and the overcoat film 32 may have three possible sectional shapes as shown in FIGS. 5A, 5B, and 5C.

Figure 5A:
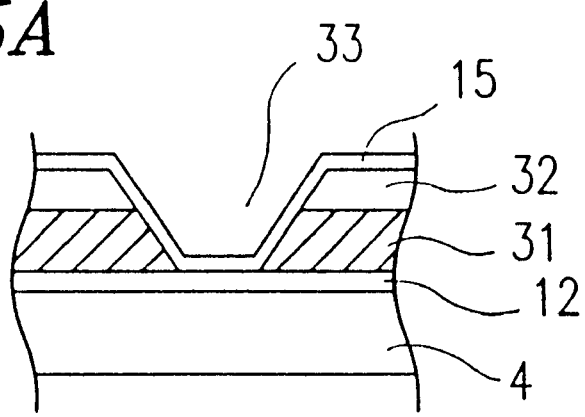
FIGS. 5A to 5C are sectional views showing a contact hole of the liquid crystal display device of FIG. 4 in three alternative forms, where the face of a color organic film and the face of an overcoat film continues smoothly (FIG. 5A), the opening of the contact hole is too large (FIG. 5B), and the face of the color organic film is covered with the overcoat film (FIG. 5C).
Figure 5B:
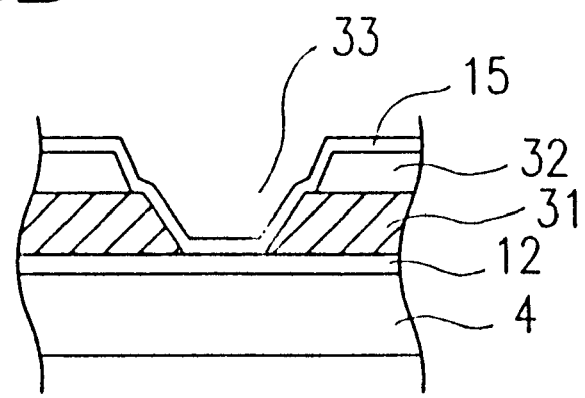
Figure 5C:
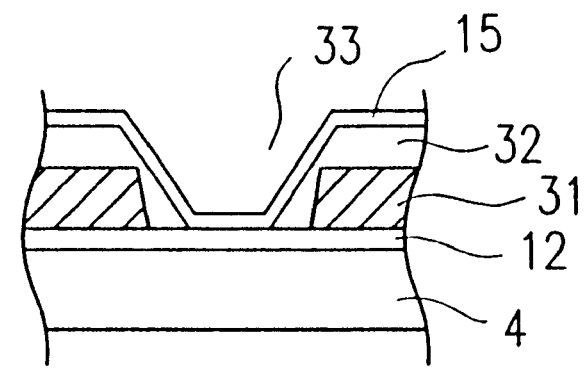

It is ideal that the face of the color organic film 31 smoothly continues with the face of the overcoat film 32 at the inner wall of the contact hole 33 as shown in FIG. 5A. This is, however, not always obtained in production. The disconnection of the pixel electrode 15 is not likely to occur as long as the faces of the two films are tapered upward as shown in FIG. 5B. In the case shown in FIG. 5B, however, the opening of the contact hole 33 is so large that the surface facing the liquid crystal layer 19 has a large concave portion corresponding to the contact hole. This disturbs the orientation of the liquid crystal molecules and thus increases the generation of the reverse-tilt domain. The sectional shape as shown in FIG. 5C is therefore preferable, where the opening of the color organic film 31 is made sufficiently smaller than that of the overcoat film 32, so that the face of the color organic film 31 is covered with the overcoat film 32. In this case, the inner wall of the contact hole 33 can be tapered by controlling only the patterning of the overcoat film 32, and no discontinuous point is formed on the inner wall of the contact hole 33.

EXAMPLE 3

Figure 6:
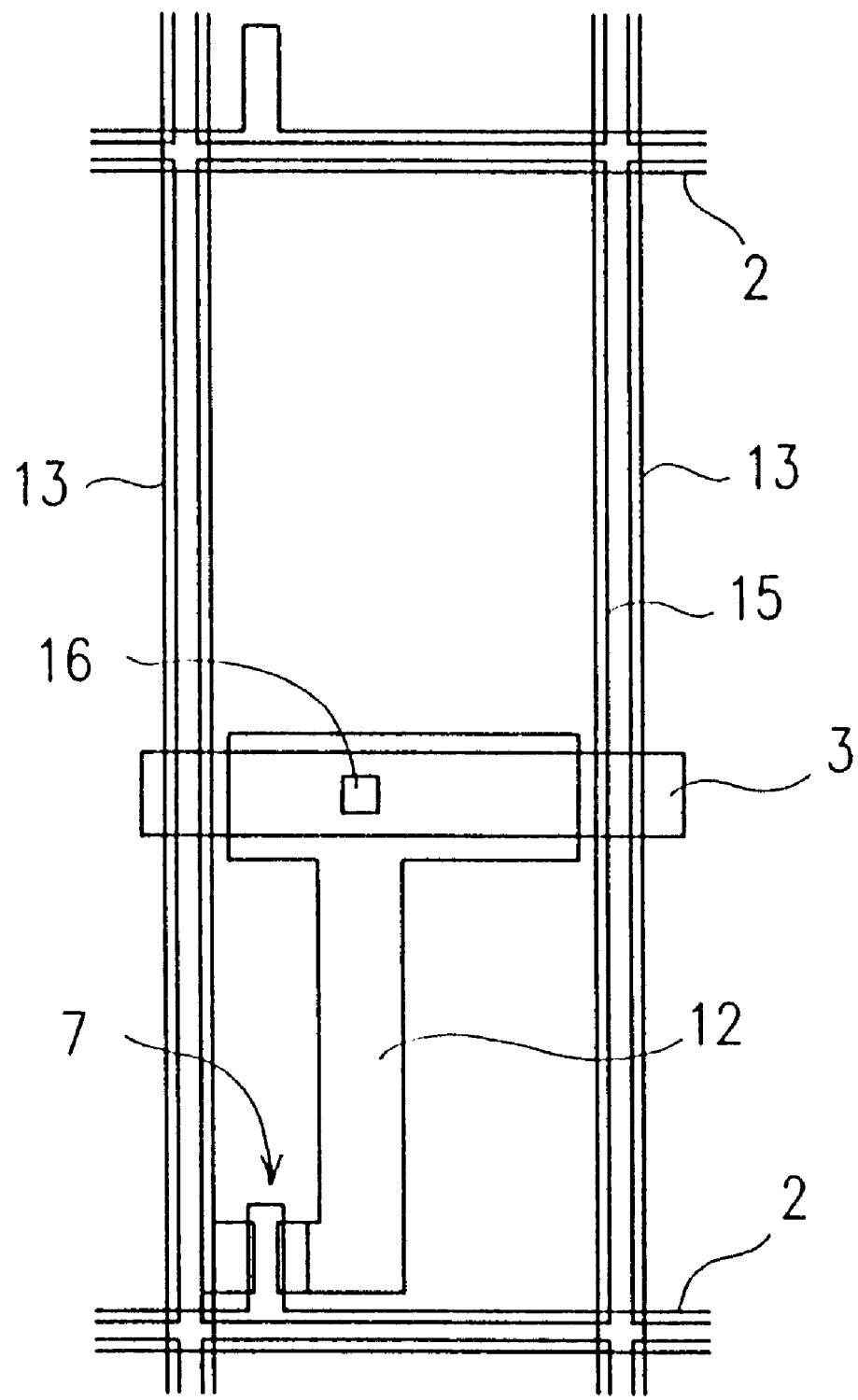
FIG. 6 is a plan view of one pixel of a liquid crystal display device of Example 3 according to the present invention.

FIG. 6 is a plan view of one pixel of a liquid crystal display device of Example 3 according to the present invention. The liquid crystal display device of this example is different from the liquid crystal display device of Example 1 shown in FIG. 1 in the position of the contact hole 16. In this example, the contact hole 16 is formed at a position located below the storage capacitance electrode 3, and the pixel electrode 15 is connected to the drain signal line 12 via the contact hole 16.

The sectional structure of the pixel in Example 3 shown in FIG. 6 is the same as that shown in FIG. 2 or 4 except for the position of the contact hole.

Since the thickness of the interlayer insulating film is 3 μm as described above, the depth of the contact hole 16 is also 3 μm. This depth of the contact hole 16 is not negligible even if the thickness of the liquid crystal layer is 4.5 μm. If the surface of the active matrix substrate in contact with the liquid crystal layer 19 has a concave portion corresponding to the contact hole, the orientation of the liquid crystal molecules is disturbed. This generates a reverse-tilt domain. In this example, such a reverse-tilt domain which is generated in the vicinity of the contact hole 16 is concealed by the storage capacitance electrode 3 since the entire contact hole 16 (including the inner wall thereof) is formed above the storage capacitance electrode 3.

In other words, light leaks in the reverse-tilt domain where the orientation of the liquid crystal molecules is disturbed, and thus the color brightness of the display screen lowers. This light leakage is blocked by the storage capacitance electrode 3.

Figure 7:
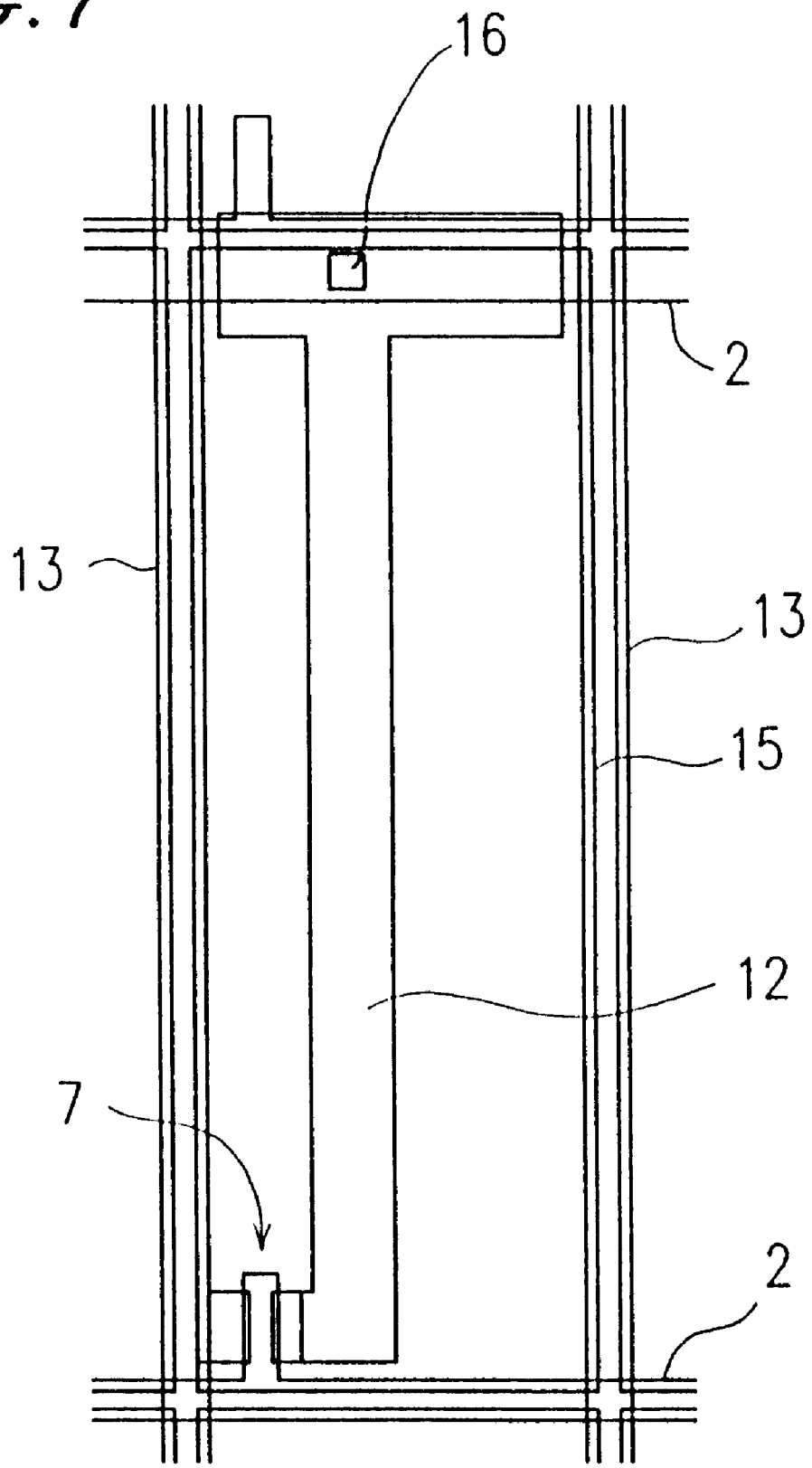
FIG. 7 is a plan view of one pixel of an alternative liquid crystal display device of Example 3 according to the present invention.

FIG. 7 shows an alternative configuration of the pixel of the liquid crystal display device of Example 3. In this alternative example, each pixel uses the gate signal line 2 for an adjacent pixel as the storage capacitance electrode thereof, and the contact hole 16 is formed at a position located above the gate signal line 2. The pixel electrode 15 is connected to the drain signal line 12 via the contact hole 16. In this case, the light leakage in the vicinity of the contact hole 16 is blocked by the gate signal line 2.

In Examples 1 to 3 above, the thickness of the interlayer insulating film was set at 3 μm. The thickness of the interlayer insulating film is preferably at least 2 μm due to the following reason.

As is well known, since each pixel electrode 15 overlaps the corresponding source signal line 13, the electric field does not affect the liquid crystal layer. If the source signal line 13 is made of a light-shading material, each space between the adjacent pixel electrodes 15 is blocked from light by the source signal line 13. This eliminates the necessity of providing a light-shading means between the adjacent pixel electrodes 15. As a result, the aperture ratio of the pixel is enhanced.

The width of the overlap between the pixel electrode 15 and the source signal line 13 is required to be at least 1 μm in consideration of the variation in the overlap in the fabrication process. This large overlap width increases the capacitance between the source signal line 13 and the pixel electrode 15, thereby increasing crosstalk therebetween and lowering the display quality.

In particular, in a liquid crystal display device for a notebook type personal computer, pixels are often arranged in vertical stripes. Since each pixel is in a rectangular shape longer along the source signal lines, the capacitance between the source signal line and the pixel electrode increases. As a result, the display quality lowers due to crosstalk generated therebetween, which is not negligible.

Figure 8:
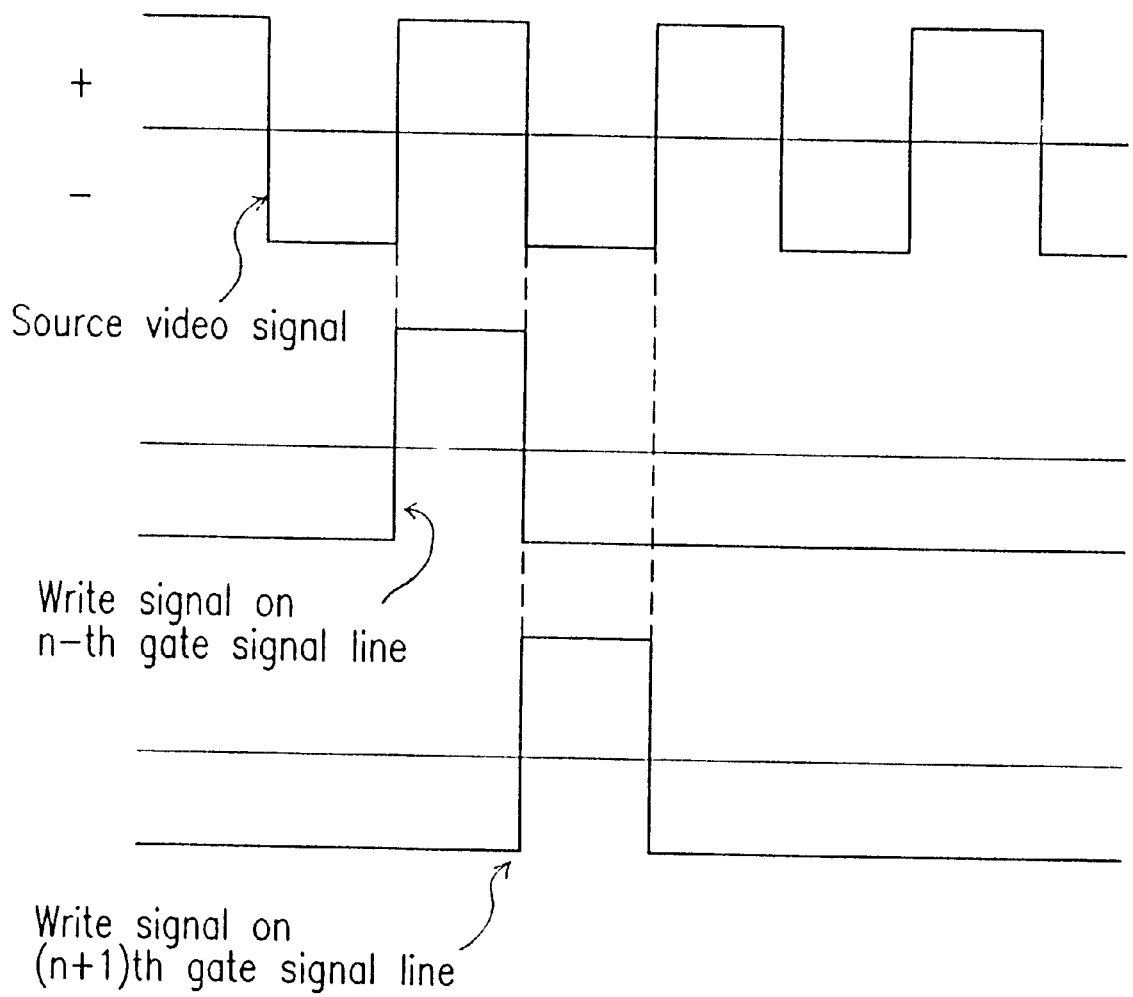
FIG. 8 is a schematic view of an exemplified video signal used in the liquid crystal display device according to the present invention.

Such influence of the crosstalk between the source signal line and the pixel electrode can be reduced by sufficiently increasing the thickness of the interlayer insulating film to reduce the capacitance between the source signal line and the pixel electrode. It can also be reduced by frequently inverting the polarity of video signals on the source signal lines. More specifically, when video signals of one polarity on the source signal lines are supplied to one row of switching elements lined along one gate signal line, the video signals on the source signal lines are supplied to the next row of switching elements line along the next gate line by inverting the polarity. This is repeated for the subsequent gate signal lines (hereinafter, this inversion is referred to as "1H inversion"). FIG. 8 schematically shows the inversion of the image signal.

Figure 9:
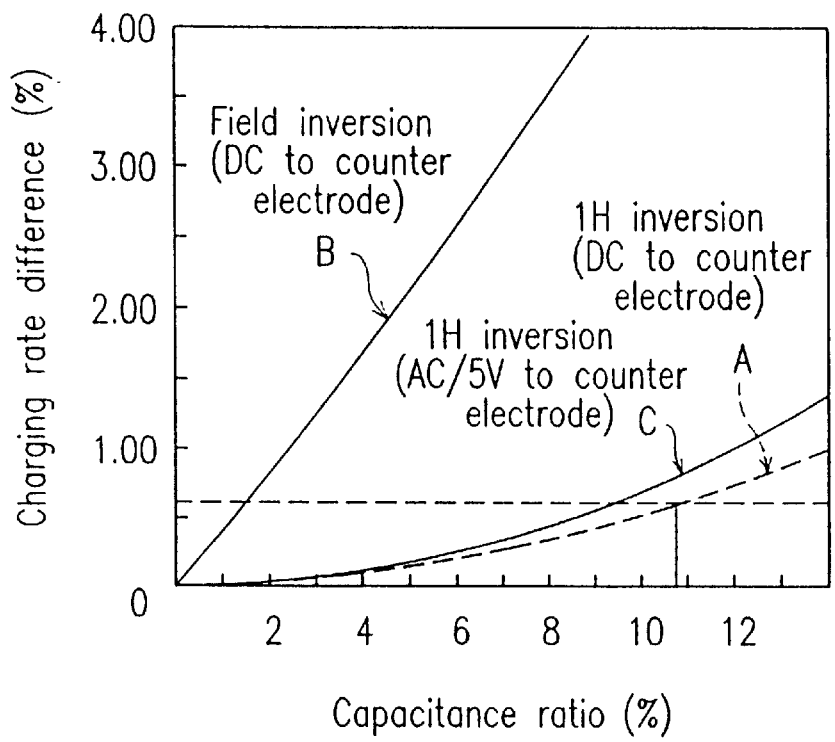
FIG. 9 is a graph showing the charging rate characteristic with respect to the capacitance between the source signal line and the pixel electrode in the liquid crystal display device according to the present invention.

FIG. 9 is a graph showing the charging rate characteristic A between the source signal line and the pixel electrode with respect to the capacitance therebetween obtained when the 1H inversion is performed. The graph also shows the charging rate characteristic B with respect to the capacitance between the source signal line and the pixel electrode obtained when the video signals on the source signal lines are inverted every field of the display screen (hereinafter, this inversion is referred to as "field inversion").

Figure 10:
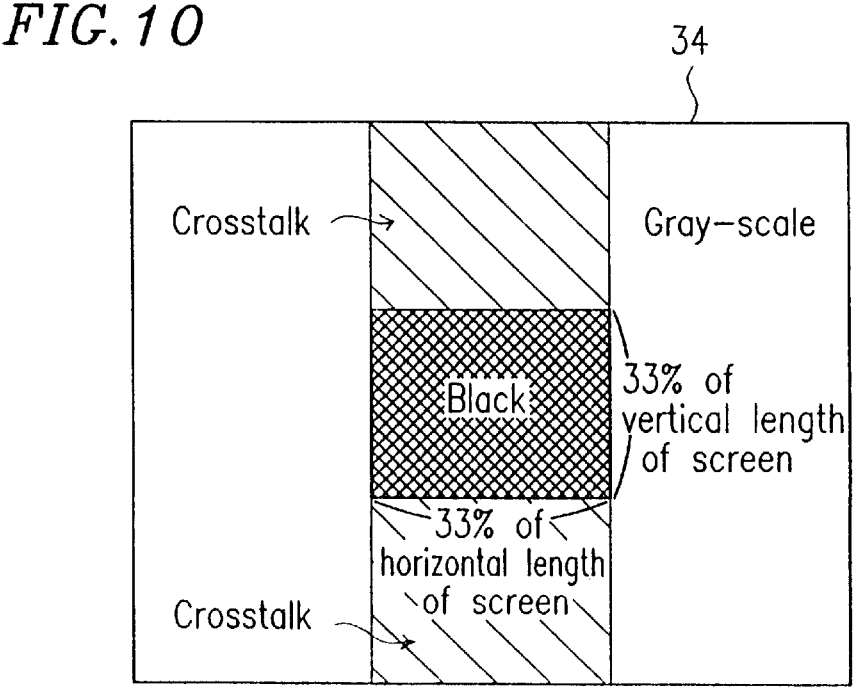
FIG. 10 shows an exemplified display pattern on the display screen of the liquid crystal display device according to the present invention.

The y-axis of this graph represents the percentage of the difference between the charging rate obtained on a gray-scale display portion when a gray-scale level is displayed on the screen and the charging rate obtained on a gray-scale display portion when a black window pattern with an occupation of 33% is displayed with a gray-scale background on a display screen 34 as shown in FIG. 10. The x-axis of the graph represents the capacitance ratio expressed by formula (1) below, which is a value in proportion to the variation in the voltage at the pixel electrode caused by the capacitance between the source signal line and the pixel electrode.

$$\text{Capacitance ratio} = C_{sd}/(C_{sd}+C_{ls}+C_s) \approx C_{sd}/(C_{ls}+C_s) \quad (1)$$

wherein $C_{sd}$ denotes the capacitance between the source signal line and the pixel electrode, $C_{ls}$ denotes the pixel capacitance (gray-scale display with a transmittance of 50%), and $C_s$ denotes the storage capacitance.

As is apparent from this graph, the variation in the charging rate between the source signal line and the pixel electrode with the change of the display pattern on the display screen is smaller at the 1H inversion than at the field inversion by about 1/5 to 1/10. This is because the polarity of the video signals is inverted in a sufficiently short cycle at the 1H inversion, compared with the field inversion, so that the influences of the positive and negative video signals on the opposite displays can be cancelled with each other.

It has been observed that, in a VGA display device with a diagonal length of 26 cm, crosstalk becomes significant and the display quality lowers when the charging rate difference shown in FIG. 9 exceeds 0.6%. The capacitance ratio expressed by formula (1) above is therefore preferably about 10% or less.

Figure 11:
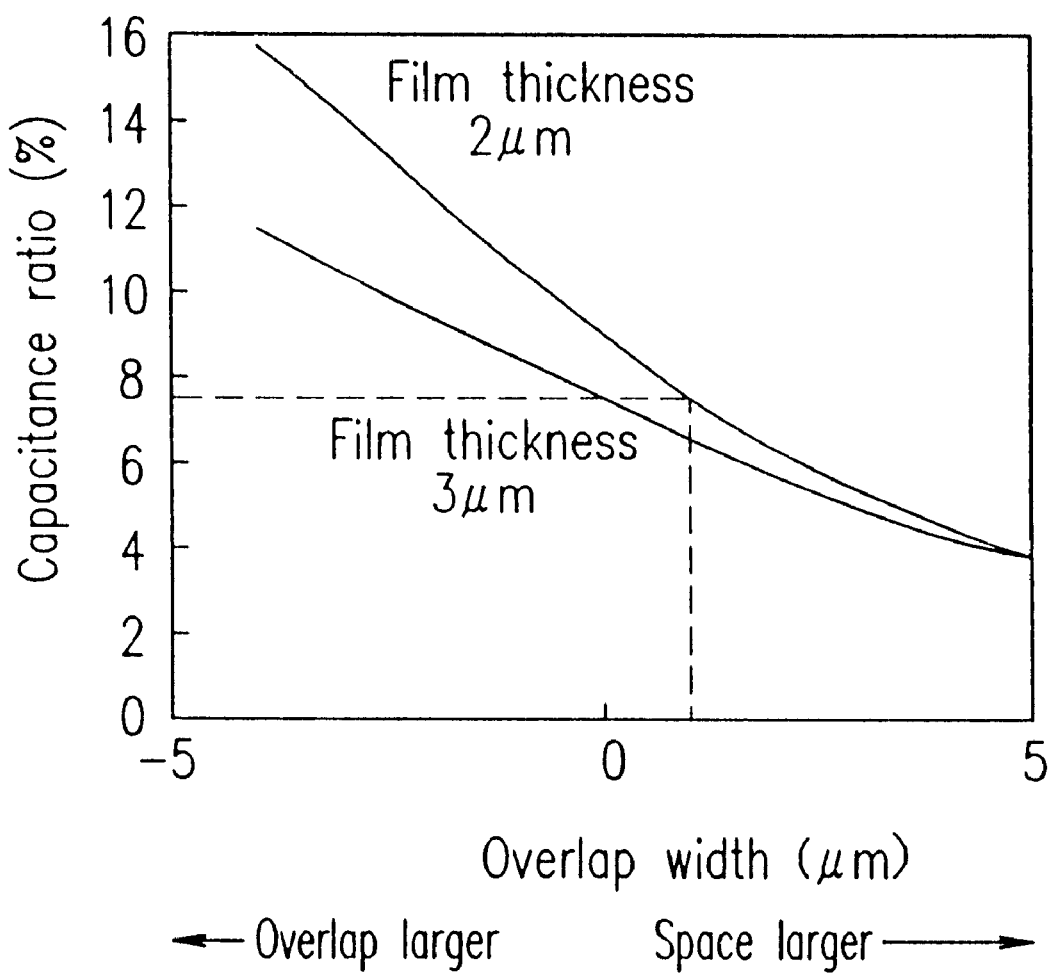
FIG. 11 is a graph showing the relationship between the capacitance ratio and the overlap width between the source signal line and the pixel electrode.
Figure 12:
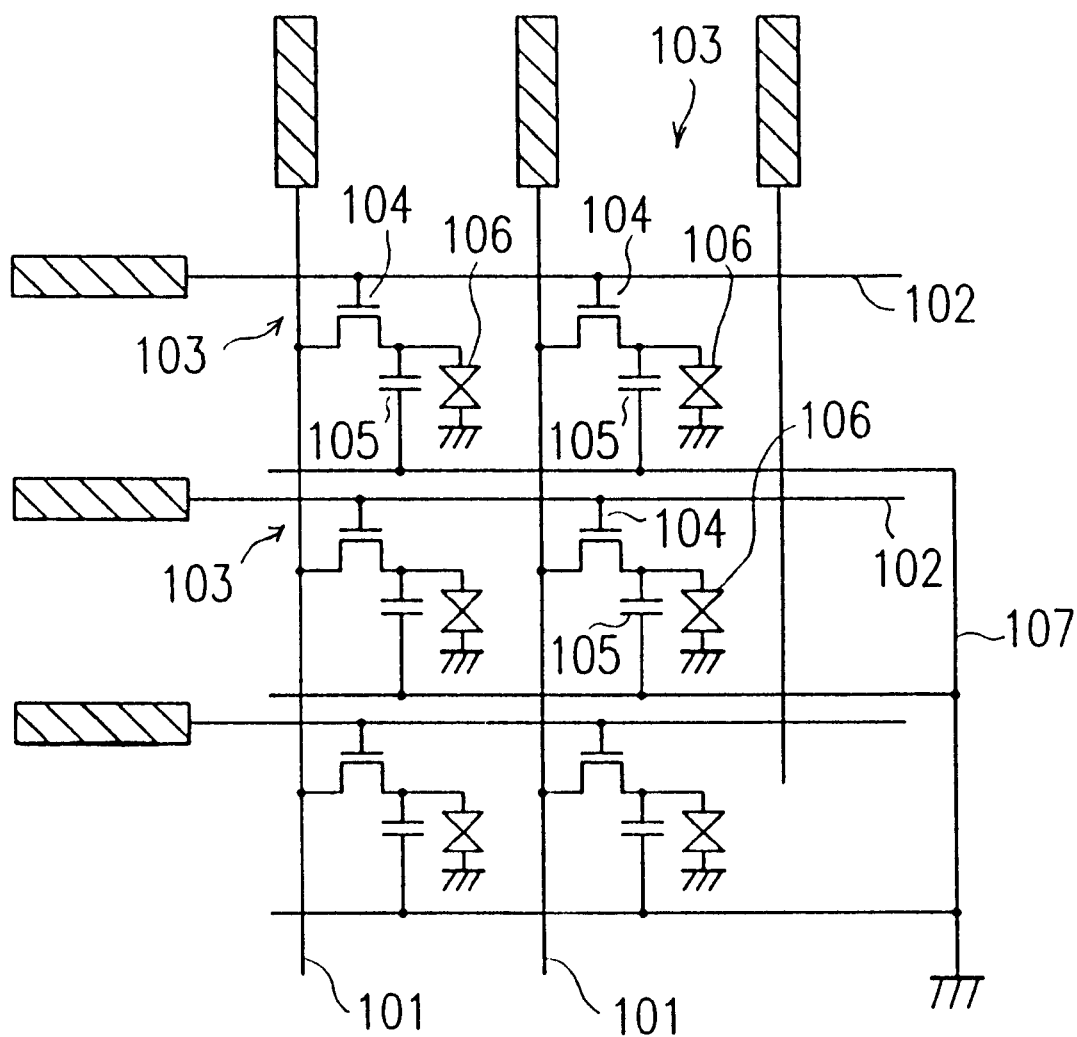
FIG. 12 is a schematic view of a liquid crystal display device.

The variation in the capacitance ratio expressed by formula (1) above with respect to the overlap width between the source signal line and the pixel electrode was calculated for the VGA display device using the thickness of the interlayer insulating film as a parameter. The results are shown as the graph in FIG. 11.

In the above calculation, the dielectric constant of the overcoat film, i.e., 3.4, was used as the dielectric constant of the interlayer insulating film. The same calculation was also performed for the dielectric constant of the color organic film, i.e., about 4.5, and substantially the same results were obtained. Therefore, only the case of the dielectric constant of 3.4 will be described below.

When processing precision is considered, the overlap width between the source signal line and the pixel electrode is required to be at least 1 μm as described above. Also, in order to satisfy the charging rate difference of less than 0.6% to ensure good display quality, the capacitance ratio expressed by formula (1) above is required to be about 10% or less as described above. Accordingly, as is apparent from the graph of FIG. 11, the thickness of the interlayer insulating film needs to be 2.0 μm or more.

In other words, when the combination of the color organic film and the overcoat film is used as the interlayer insulating film and the overlap width between the source signal line and the pixel electrode is set at 1 μm, the thickness of the interlayer insulating film needs to be 2 μm or more to ensure good display quality.

If the above condition is satisfied, good display free from vertical crosstalk appearing on the display screen can be obtained without the necessity of frequently inverting the polarity of the video signals on the source signal lines.

FIG. 9 also shows the charging rate characteristic C with respect to the capacitance ratio obtained by driving the counter electrode 18 with an AC voltage (amplitude: 5V) in synchronization with the inversion cycle of the video signals on the source signal lines while the 1H inversion is being effected. This AC driving is advantageous in that the amplitude of the video signals on the source signal lines can be kept small. The charging rate difference for the AC driving is larger than the characteristic A for the DC driving by about 10%, but it is sufficiently small compared with the characteristic C for the field inversion. Therefore, good display free from vertical crosstalk appearing on the display screen can also be obtained by the AC driving with the 1H inversion.

Thus, according to the present invention, color organic films are laminated to the substrate to form the interlayer insulating film. This makes it possible to obtain an interlayer insulating film with a uniform thickness, and thus various problems caused by the variation in the thickness of the interlayer insulating film can be overcome.

In the case of film formation by spinning in the conventional pigment dispersion method, a resin material is applied over a wide range of a resultant active matrix substrate though only a small percentage of the applied resin material is finally left on the resultant active matrix substrate as the interlayer insulating film. This raises the production cost. On the contrary, in the method according to the present invention, the amount of wasted material is small and thus the production cost is low.

Specifically, 90% or more of the resin material is not utilized in the case of the film formation by spinning in the conventional pigment dispersion method. According to the method of the present invention, almost all of the resin material is utilized except for the portion used for temporary fixing at the lamination and the end portion of the film to be cut off. Moreover, the size of the film can be changed depending on the size of the area where the film is to be laminated. The effective utilization factor of the material is therefore very large.

The film thickness after baking is 3.5 $\mu$m±8.5% in the case of the film formation by spinning in the conventional pigment dispersion method. According to the method of the present invention, it is typically 3.5 $\mu$m ±3.5%, and ±5.0% at maximum. Thus, the variation in the thickness of the interlayer insulating film can be reduced.

In the case of the film formation by spinning in the conventional pigment dispersion method, the thickness of the interlayer insulating film is difficult to control. Therefore, since the thickness of the interlayer insulating film varies, the change of the potential at the pixel capacitance due to an influence of the capacitance formed between the pixel electrode and the gate signal line is not uniform. As a result, a large DC component is applied to a certain portion of the liquid crystal layer, significantly lowering the display quality and reliability at the portion. According to the method of the present invention, since the interlayer insulating film is made of the organic films and the thickness thereof is uniform, the lowering of the display quality and reliability due to the change of the potential at the pixel capacitance is prevented.

According to the method of the present invention, the number of steps required is not especially large, compared with the conventional methods where the color filter is formed in the counter substrate and with the film formation by spinning in the pigment dispersion method.

In one embodiment of the invention, photosensitive films are used. Using photosensitive films, the production process is simplified, and good mass-productivity and cost reduction can be realized.

Otherwise, non-photosensitive films may be laminated, and then a photoresist is formed on the films, exposed to light, and developed to pattern the films by etching. In this case, the films can be processed with high precision though the number of steps increases.

More specifically, photosensitive films are inferior in the resolution of the pattern by light exposure, which is about 10 $\mu$m. On the contrary, a photoresist can provide a resolution as high as about 3 $\mu$m. Using such a photoresist, high-precision patterning of underlying films is possible.

In one embodiment of the invention, the color organic film includes light-shading film pieces which serve as the black matrix. Such light-shading film pieces are formed by laminating a light-shading organic film to the resultant active matrix substrate and then exposing the film to light twice, one from the top surface of the active matrix substrate as pattern exposure and the other from the bottom surface thereof as overall exposure. By the overall exposure from the bottom surface of the active matrix substrate, light-shading film pieces can be formed for all of the portions where light leakage may arise.

In the case where a transparent conductive film (e.g., an ITO film) is used for the source signal lines, the light-shading film pieces can be formed above the source signal lines by first laminating a light-shading organic film in position and then exposing the film to light by the overall exposure from the bottom surface of the active matrix substrate.

By covering the source signal lines with the light-shading film pieces, light reflection from the source signal lines are blocked by the light-shading film pieces even if the source signal lines have high reflectance. The reflectance of the display screen is therefore suppressed, and thus the display quality is enhanced.

Alternatively, instead of arranging the light-shading film piece at each boundary of adjacent primary color film pieces, the primary color film pieces may overlap at each boundary. Since the primary color film pieces of different colors are overlapped, this overlap portion has the light-shading property, preventing light leakage from occurring at each boundary of adjacent pixels. Moreover, the resultant interlayer insulating film is sufficiently thick at the overlap portions of the primary color film pieces located above the source signal lines. This reduces the capacitance between each source signal line and the corresponding pixel electrode, and thus suppresses crosstalk therebetween without lowering the transmittance of the pixel portion.

In one embodiment of the invention, the interlayer insulating film is a double-layer structure composed of the color organic film and the overcoat film. With this structure, the overcoat film covers the unevenness of the color organic film, making the top surface of the interlayer insulating film smooth. As a result, the pixel electrodes formed on the overcoat film are not easily disconnected, reducing the occurrence of failures.

With the above structure, the color organic film and the overcoat film can be made thin, compared with the interlayer insulating film composed of only the color organic film. Accordingly, each film piece can be positioned to be as close as several micromicrons to the step formed by an underlying film.

In one embodiment of the invention, contact holes are formed in the following manner. The color organic film and the overcoat film are first formed. A photoresist is then formed on the overcoat film, exposed to light, and developed, to etch the color organic film and the overcoat film, so as to form the contact holes.

Alternatively, the color organic film and the overcoat film are formed and then baked. A photoresist is formed on the baked overcoat film, exposed to light, and developed, to etch the color organic film and the overcoat film, so as to form the contact holes.

By baking the overcoat film before the etching, the difference in the etching rate between the color organic film and the overcoat film can be reduced even when the color organic film has been previously baked.

Each contact hole is preferably formed at a position located above the storage capacitance electrode. Since the portion of the interlayer insulating film where the contact hole is formed does not serve as the color filter nor the black matrix, light passing through the contact hole should be blocked, and this can be done by the storage capacitance electrode.

The surface of the active matrix substrate in contact with the liquid crystal layer has recesses corresponding to the contact holes. These recesses disturb the orientation of liquid crystal molecules and generate reverse-tilt domains. When the contact holes are located above the storage capacitance electrodes, such reverse-tilt domains can be concealed with the storage capacitance electrodes. The reverse-tilt domains are therefore invisible on the display screen, and thus the contrast of the display screen is prevented from lowering.

The surface of the interlayer insulating film can be smooth by setting the taper angle of the contact holes at 45° or less. As a result, the pixel electrodes are not easily disconnected.

The inner wall of each contact hole can be smooth by covering the inner wall with the overcoat film. Alternatively, the face of the color organic film and the face of the overcoat film may be exposed to the inner wall of the contact hole as long as no step is formed between these faces.

In one embodiment of the invention, each pixel electrode overlap the corresponding source signal line by an overlap width of 1 μm or more. When video signals of one polarity on the source signal lines are supplied to one row of switching elements lined along one gate signal line, the video signals on the source signal lines are supplied to the next row of switching elements lined along the next gate line by inverting the polarity. This is repeated for the subsequent gate signal lines.

According to the above method, even if a video signal on one source signal line affects the potentials at the pixel capacitances via the capacitances between the pixel electrodes and the source signal lines, the variation in the potential at the pixel capacitances can be reduced since the polarity of the video signal frequently changes. In other words, crosstalk generated along this source signal line is suppressed.

The influence of the above crosstalk can be reduced if the ratio of the capacitance between the pixel electrode and the source signal line to the sum of the pixel capacitance obtained by the pixel electrode and the storage capacitance obtained by the storage capacitance electrode at gray-scale display is 10% or less. Good display quality is therefore obtained. The above ratio of 10% or less can be obtained if the thickness of the interlayer insulating film is 2 μm or more.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for fabricating a liquid crystal display device including an active matrix substrate, a counter substrate disposed to face the active matrix substrate, and a liquid crystal layer interposed between the active matrix substrate and the counter substrate, the active matrix substrate including:

gate signal lines for supplying control signals and source signal lines for supplying video signals formed so as to cross each other;

switching elements formed at crossings of the gate signal lines and the source signal lines in a matrix, the switching elements being connected to the gate signal lines and the source signal lines;

an interlayer insulating film formed on the resultant active matrix substrate;

and pixel electrodes formed on the interlayer insulating film in a matrix, wherein a color organic film is used as the interlayer insulating film, and the color organic film is laminated to the resultant active matrix substrate.

2. A method for fabricating a liquid crystal display device according to claim 1, wherein the color organic film is photosensitive, and after the color organic film is laminated, the color organic film is patterned by light exposure and development.

3. A method for fabricating a liquid crystal display device according to claim 1, wherein after the color organic film is laminated, a photoresist is formed, exposed to light, and developed, to pattern the color organic film by etching.

4. A method for fabricating a liquid crystal display device according to claim 1, wherein the color organic film is composed of primary color film pieces arranged in a matrix, and the primary color film pieces are obtained by laminating transparent organic films colored with the respective primary colors and then patterning the transparent organic films.

5. A method for fabricating a liquid crystal display device according to claim 4, wherein ends of adjacent primary color film pieces are overlapped with each other.

6. A method for fabricating a liquid crystal display device according to claim 1, wherein the color organic film further includes light-shading film pieces, and the light-shading film pieces are obtained by laminating a light-shading organic film and then patterning the light-shading organic film.

7. A method for fabricating a liquid crystal display device according to claim 6, wherein in order to form the light-shading film pieces, the laminated light-shading organic film is subjected to pattern exposure from a top surface of the active matrix substrate and overall exposure from a bottom surface of the active matrix substrate.

8. A method for fabricating a liquid crystal display device according to claim 6, wherein the light-shading film pieces are disposed above the source signal lines.

9. A method for fabricating a liquid crystal display device according to claim 8, wherein the source signal lines are made of a transparent conductive film, and the light-shading film pieces are disposed above the source signal lines by laminating the light-shading organic film on the resultant active matrix substrate and allowing the light-shading organic film to be subjected to overall exposure from a bottom surface of the active matrix substrate.

10. A method for fabricating a liquid crystal display device according to claim 1, wherein the interlayer insulating film is composed of a color organic film and a photosensitive overcoat film, and the overcoat film is laminated to the color organic film and then patterned by light exposure and development.

11. A method for fabricating a liquid crystal display device according to claim 10, wherein after the formation of the color organic film and the overcoat film, a photoresist is formed, exposed to light, and developed, to etch the color organic film and the overcoat film, so as to form contact holes.

12. A method for fabricating a liquid crystal display device according to claim 10, wherein after the formation of the color organic film and the overcoat film, baking is performed, and then a photoresist is formed, exposed to light, and developed, to etch the color organic film and the overcoat film, so as to form contact holes.

13. A method for fabricating a liquid crystal display device according to claim 1, wherein the interlayer insulating film is composed of a color organic film and a photosensitive overcoat film, and the overcoat film is laminated to the color organic film, and then a photoresist is formed, exposed to light, and developed, to pattern the overcoat film by etching.

14. A method for fabricating a liquid crystal display device according to claim 13, wherein after the formation of the color organic film and the overcoat film, a photoresist is formed, exposed to light, and developed, to etch the color organic film and the overcoat film, so as to form contact holes.

15. A method for fabricating a liquid crystal display device according to claim 13, wherein after the formation of the color organic film and the overcoat film, baking is performed, and then a photoresist is formed, exposed to light, and developed, to etch the color organic film and the overcoat film, so as to form contact holes.

16. A liquid crystal display device comprising an active matrix substrate, a counter substrate disposed to face the active matrix substrate, and a liquid crystal layer interposed between the active matrix substrate and the counter substrate, the active matrix substrate including:

gate signal lines for supplying control signals and source signal lines for supplying video signals formed so as to cross each other;

switching elements formed at crossings of the gate signal lines and the source signal lines in a matrix, the switching elements being connected to the gate signal lines and the source signal lines;

an interlayer insulating film formed on the resultant active matrix substrate;

and pixel electrodes formed on the interlayer insulating film in a matrix, wherein a laminated color organic film is used as the interlayer insulating film.

17. A liquid crystal display device according to claim 16, wherein the interlayer insulating film further includes an overcoat film.

18. A liquid crystal display device according to claim 16, wherein contact holes are formed through the interlayer insulating film, and the pixel electrodes are connected to the switching elements via the contact holes.

19. A liquid crystal display device according to claim 18, further including storage capacitance electrodes, wherein a storage capacitance obtained by each of the storage capacitance electrodes is connected in parallel with a pixel capacitance obtained by the pixel electrode, and each contact hole overlaps the storage capacitance electrode.

20. A liquid crystal display device according to claim 19, wherein each contact hole completely overlaps the storage capacitance electrode.

21. A liquid crystal display device according to claim 18, wherein the taper angle of the contact hole is 45° or less with respect to a line normal to the substrate.

22. A liquid crystal display device according to claim 17, wherein contact holes are formed through the interlayer insulating film, and the pixel electrodes are connected to the switching elements via the contact holes, and an inner wall of each of the contact holes is covered with the overcoat film.

23. A liquid crystal display device according to claim 17, wherein contact holes are formed through the interlayer insulating film, and the pixel electrodes are connected to the switching elements via the contact holes, and an inner wall of each of the contact holes includes an exposed face of the color organic film and an exposed face of the overcoat film.

24. A liquid crystal display device according to claim 16, wherein each of the pixel electrodes overlaps the corresponding source signal line by an overlap width of 1 $\mu$m or more, and when the video signals with one polarity on the source signal lines are supplied to one row of switching elements lined along one gate signal line, the video signals on the source signal lines are supplied to the next row of switching elements lined along the next gate line by inverting the polarity, and this is repeated for the remaining gate signal lines.

25. A liquid crystal display device according to claim 16, further including storage capacitance electrodes, wherein a storage capacitance obtained by each of the storage capacitance electrodes is connected in parallel with a pixel capacitance obtained by the pixel electrode, and the ratio of a capacitance between the pixel electrode and the source signal line to a sum of the pixel capacitance obtained by the pixel electrode and the storage capacitance obtained by the storage capacitance electrode is 10% or less.

26. A liquid crystal display device according to claim 16, wherein the thickness of the interlayer insulating film is 2 $\mu$m or more.

27. A liquid crystal display device according to claim 17, wherein the thickness of the interlayer insulating film is 2 $\mu$m or more.

* * * * *